Oct. 28, 1930.    L. L. FOJTIK    1,780,069
FURROW PLOW
Filed Nov. 26, 1928    3 Sheets-Sheet 1
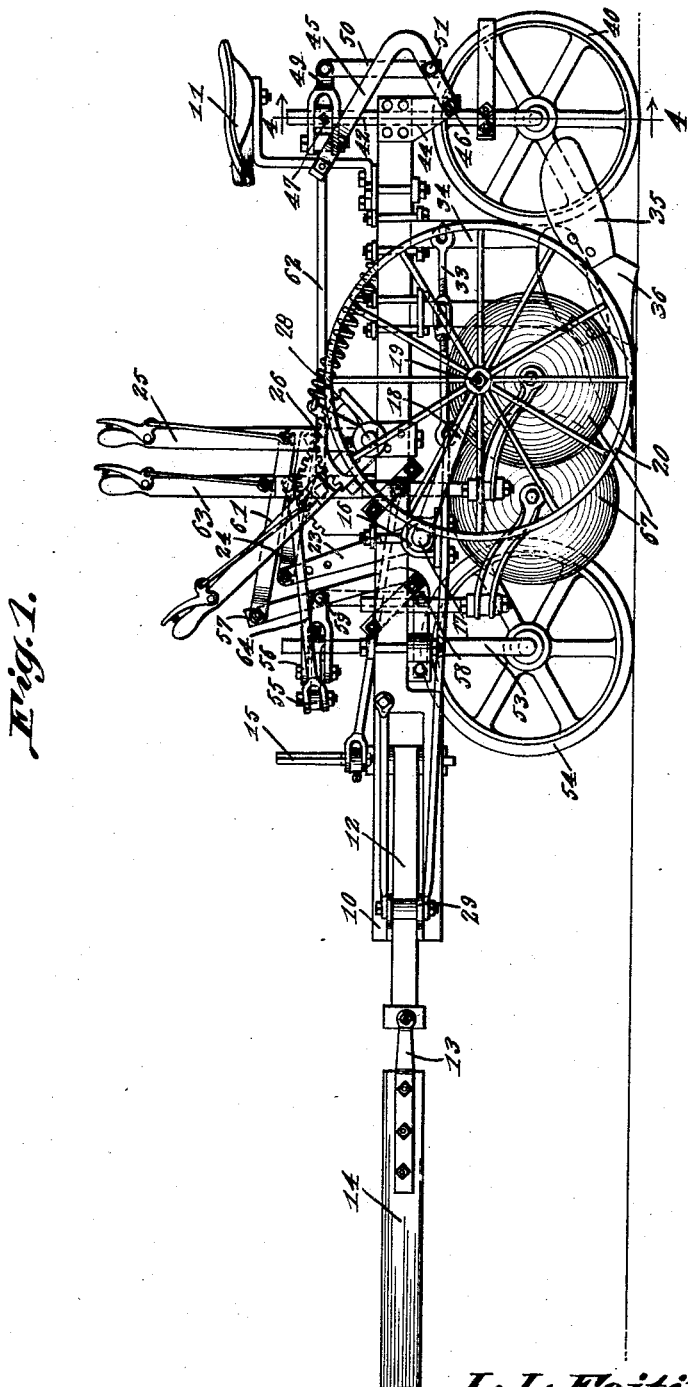

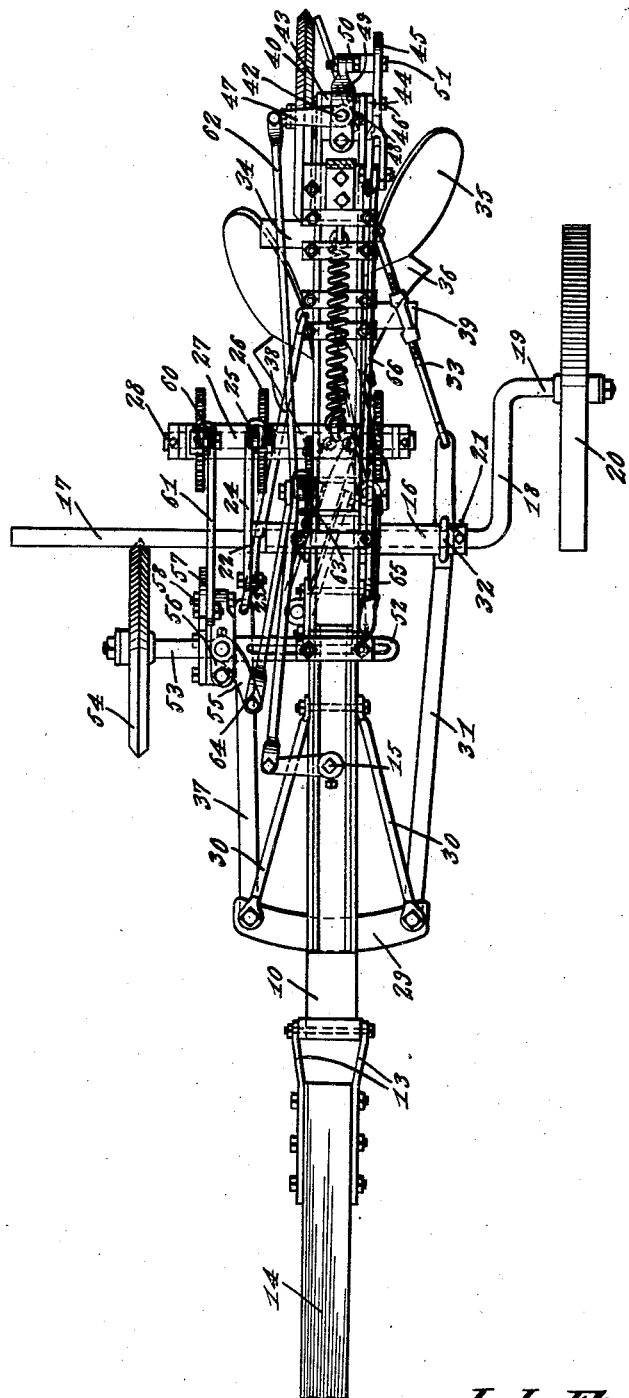

Oct. 28, 1930.  L. L. FOJTIK  1,780,069
FURROW PLOW
Filed Nov. 26, 1928   3 Sheets-Sheet 3
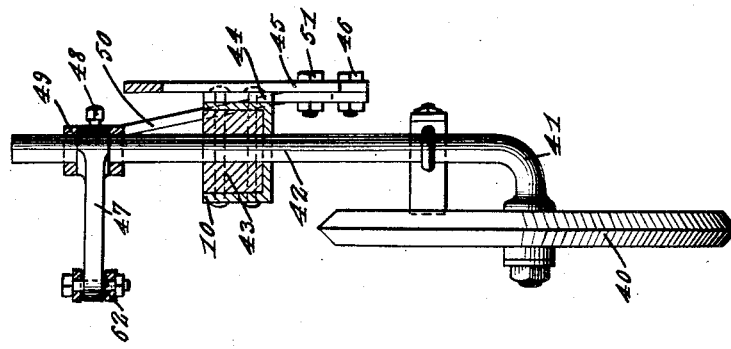
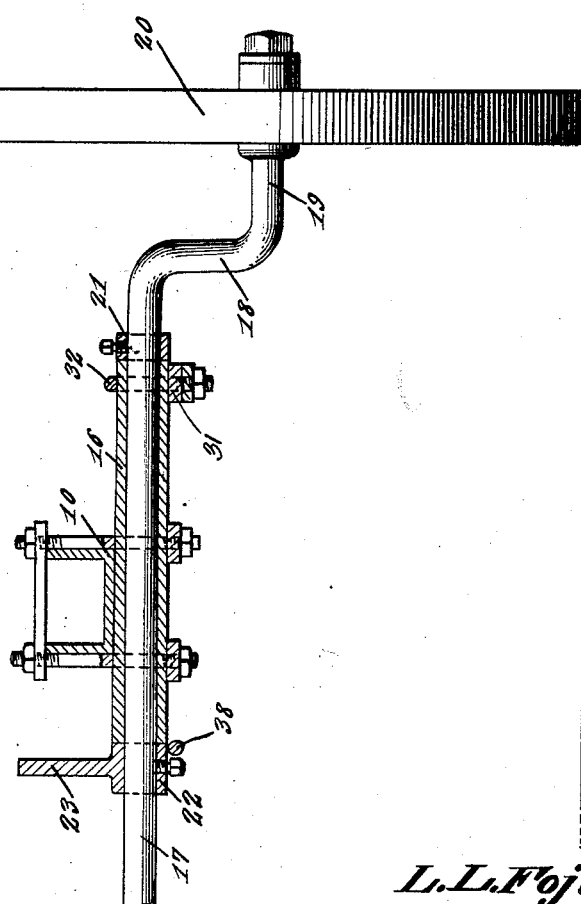
L. L. Fojtik, INVENTOR
BY Victor J. Evans
ATTORNEY Patented Oct. 28, 1930

1,780,069

UNITED STATES PATENT OFFICE

LOUIS LEE FOJTIK, OF NEEDVILLE, TEXAS

FURROW PLOW

Application filed November 26, 1928. Serial No. 321,926.

This invention relates to improvements in farming implements known as the furrow plow and which embodies among other characteristics means for raising and lowering the furrow wheels to regulate the depth of the plow shares within the ground.

Another object of the invention comprehends a ground wheel adapted to compensate with the furrow wheels in the regulation of the plow cuts.

A further object of the invention contemplates steering means adapted for connectoin with the furrow wheels to guide the implement in line with the draft.

More specifically stated the connecting end of the plow beam is adapted to be steered in line with the draft to obviate side pulling and overturning of the implement.

An additional object of the invention consists in the provision of means for regulating the distance between the furrow wheels, whereby the implement may be employed for digging furrows different widths apart.

With the above and other objects in view, the invention further consists of the following novel features and details of construction, to be hereinafter more fully described, illustrated in the accompanying drawings and pointed out in the appended claim.

In the drawings:—

Figure 1 is a side elevation of the invention.

Figure 2 is a top plan view thereof.

Figure 3 is a fragmentary longitudinal sectional view taken through the mounting and operating mechanism for the ground wheel.

Figure 4 is a vertical sectional view taken on the line 4—4 of Figure 1.

Referring to the drawings in detail, wherein like characters of reference denote corresponding parts, the reference character 10 indicates a plow beam having a driver seat 11 supported upon one end and a block 12 within the bifurcated forward end of the plow beam. A clevis 13, carried upon the extended end of the block, is adapted for connections with a wagon tongue or other connection, such as indicated at 14. A steering shaft 15, vertically disposed within the plow beam, is extended within the bifurcation therefor and the inner most end of the block 12. The purpose of such construction will be presently apparent.

A sleeve 16, horizontally disposed upon and secured to the underside of the beam 10, is adapted to accommodate a shaft 17 having an offset 18 upon one end which terminates to provide a stub axle 19 journaling a ground wheel 20 thereon. A stop collar 21, carried by the axle 17, is adapted to abut the end of the axle sleeve 16 adjacent the offset 18, whereas a collar 22 remotely disposed from the stop collar 21 and abutting the opposed end of the sleeve 16 terminates to provide an arm 23. A pivoted link 24, having connection with the outermost end of the arm 23, is adapted for connection at its opposite end with an operating lever 25 adapted to be shifted across a segment 26 carried upon a sleeve 27. A lever shaft 28, extended through the sleeve 27, has portions removed within which the innermost end of the lever 25 is extended for connection with the shaft 28. The aforementioned mounting of the lever 25 is common to other levers which will be hereinafter described.

A clevis 29, curved throughout its length, is laterally projected from the block 12 and has its ends connected to the opposed sides of the beam 10 through the instrumentality of the brace rods 30. A link 31, having connection with one end of the clevis 29, is attached to the underside of the sleeve 16 through the instrumentality of a U-bolt 32.

A turnbuckle rod 33 is hooked or otherwise secured within the innermost extending end of the link 31, whereas its opposite end is connected with the beam 34 supporting the mold board 35 with a left side plow 36. A companionate link 37, having connection at its forward end with the opposite end of the clevis 29, is extended rearwardly and to one side of the plow beam 10 and which terminates slightly in advance of the sleeve 16. A bar 38, passed beneath the sleeve 16 and having connection at its forward end with the aforementioned end of the link 37, is connected at its opposite end with a foot rest 39.

A rear furrow wheel 40, journaled upon the outwardly offset end 41 of an axle 42, journaled within a boxing or other bearing 43, carried by the plow beam 10, is adapted to be disposed to one side of the plow beam, substantially as illustrated in the top plan view in Figure 2 of the drawings. An anchorage plate 44, secured to one side of the plow beam 10, in oppositely disposed relation to the rear furrow wheel 40, depends an appreciable distance therefrom to facilitate connection of an L-shaped lifting arm 45 therewith, as indicated at 46. A crank arm 47, fixed to the uppermost end of the axle 42 by a set screw 48, is interposed between the jaws or bifurcated portion of a forked clamp 49 loosely mounted upon the axle. A link 50, having pivotal connection at its upper end with the clamp 49, is eccentrically connected, as at 51, to the L-shaped lifting arm 45.

A substantially elongated U-shaped plate 52, carried upon the plow beam 10, is adapted to journal the vertically disposed portion of an axle 53 for a front furrow wheel 54. A crank arm 55, constructed after the manner of the crank arm 47 and fixed adjacent the uppermost end of the axle 53, also supports a loosely mounted forked clamp 56 similar to that as designated at 49 in Figure 4 of the drawings.

An L-shaped lifting lever 57, pivotally mounted, as at 58, to the lowermost end of a link 59, pivotally mounted at its upper end with the forked clamp 56, is adapted to swing from the pivot 58 when actuated by a lifting lever 60 through the instrumentality of a connecting link 61 having connection with the uppermost extremity thereof. A link 62 is also employed to provide the means of connection between a turning lever 63 with the free end of the crank arm 47. A separate link 64 is adapted for establishing the means of connection between the aforementioned lever 53 and the crank arm 55. The L-shaped lever 45, operable by an additional lever 65 through a link 66, is adapted to raise and lower the rear furrow wheel 40 independently of the front furrow wheel 54, in conjunction with the ground engaging wheel 20 to set the plow shares at desired depths when traversing uneven or rolling ground.

As manifest from the foregoing description and accompanying drawings, the U-shaped plate 52 will afford lateral adjustment to the forward furrow wheel 54, whereby the distance between the furrow wheels may be regulated for cultivating fields to be plowed in furrows different depths apart.

Colters, vertically adjustable upon the plow beam 10, are adapted to be disposed slightly in advance of the plow shares 36 to cut the sod, roots, etc., whereby greater ease in the manipulation of the entire implement will be experienced.

As mentioned in the foregoing, the block 12 was adapted to follow the wagon tongue 14 when swung upon the steering shaft 15. To this end, I have provided a positive means of connection between the turning lever 63 and steering shaft 15 by a link and arm connection, as best illustrated in Figure 2 of the drawings. Such connection will facilitate simultaneous turning of the furrow wheels in conjunction with that of the block 12, whereby the entire implement would track directly after and in line with the draft to obviate upsetting of the implement by side draft.

By the arrangement of the levers upon the shaft 28, it is apparent that all of the levers can be simultaneously operated if desired to raise and lower the entire plow in accordance with the depth and pitch of the colters, breakers, etc. All of the wheels will, therefore, compensate or coact with one another to facilitate execution of the adjustment.

The invention is susceptible of various changes in its form, proportions and minor details of construction, and the right is herein reserved to make such changes as properly fall within the scope of the appended claim.

Having thus described the invention, what is claimed is:—

A plow construction comprising a beam having furrow wheels located adjacent the ends thereof, a land wheel for the beam supporting the other side of the plow, said beam having a bifurcated extremity, a block swingably mounted within the bifurcation including a steering shaft, lifting and turning arms for each of the furrow wheels, mechanically operated means establishing operative connection between the steering shaft and turning arms to cause the plow to automatically track after and in alignment with the point of draft, an operating lever cooperatively associated with the mechanically operated means to manually turn the furrow wheels, mechanically operated means connected with the lifting arms to independently elevate the respective furrow wheels, and mechanically operated means simultaneously raising and lowering one of the furrow wheels and the land wheel.

In testimony whereof I affix my signature.

LOUIS LEE FOJTIK.